(12) United States Patent
Sharma et al.

(10) Patent No.: US 12,551,205 B2
(45) Date of Patent: Feb. 17, 2026

(54) MEDICAL ARTICULATION DEVICES AND METHODS OF USING THE SAME

(71) Applicant: Boston Scientific Medical Device Limited, Galway (IE)

(72) Inventors: Deepak Kumar Sharma, Muzaffarnagar (IN); Sharath Kumar G, Kanakapura (IN)

(73) Assignee: Boston Scientific Medical Device Limited, Galway (IE)

( * ) Notice: Subject to any disclaimer, the term of this patent is extended or adjusted under 35 U.S.C. 154(b) by 1152 days.

(21) Appl. No.: 17/448,221

(22) Filed: Sep. 21, 2021

(65) Prior Publication Data

US 2022/0087666 A1  Mar. 24, 2022

Related U.S. Application Data (60) Provisional application No. 63/081,815, filed on Sep. 22, 2020.

(51) Int. Cl.
*A61B 17/00* (2006.01)

(52) U.S. Cl.
CPC ............ *A61B 17/00234* (2013.01); *A61B 2017/00314* (2013.01); *A61B 2017/00336* (2013.01); *A61B 2017/00367* (2013.01); *A61B 2017/0042* (2013.01)

(58) Field of Classification Search
None
See application file for complete search history.

(56) References Cited

U.S. PATENT DOCUMENTS

| | | | |
|---|---|---|---|
| 5,203,785 A * | 4/1993 | Slater | A61B 17/29 606/174 |
| 8,840,566 B2 | 9/2014 | Seibel et al. | |
| 2006/0074407 A1 | 4/2006 | Padget et al. | |
| 2010/0228235 A1 | 9/2010 | Lee et al. | |
| 2015/0088151 A1 | 3/2015 | Hatta | |
| 2017/0281221 A1 | 10/2017 | Boudreaux | |
| 2018/0280009 A1* | 10/2018 | Kietruakis | A61B 10/04 |
| 2019/0110782 A1* | 4/2019 | Tasci | A61B 17/29 |
| 2019/0133635 A1 | 5/2019 | Stulen et al. | |

FOREIGN PATENT DOCUMENTS

WO  2020218921 A2  10/2020

OTHER PUBLICATIONS

International Search Report and Written Opinion issued on Nov. 22, 2021, in counterpart International Patent Application No. PCT/IB2021/058607 (14 pages, in English).

* cited by examiner

*Primary Examiner* — William J Levicky
*Assistant Examiner* — Anant A Gupta
(74) *Attorney, Agent, or Firm* — Bookoff McAndrews PLLC (57) ABSTRACT

A medical device that includes a handle, an actuator movably coupled to the handle, a shaft extending distally from the handle, and a sheath including a distal end disposed within the shaft and a proximal end disposed within the handle. The sheath includes a plurality of branches secured to one another at the distal end and separated from one another at the proximal end. The actuator is coupled to each of the plurality of branches at the proximal end of the sheath, and the actuator is configured to move each of the plurality of branches relative to one another to articulate the shaft in a plurality of directions.

19 Claims, 4 Drawing Sheets

MEDICAL ARTICULATION DEVICES AND METHODS OF USING THE SAME

CROSS-REFERENCE TO RELATED APPLICATIONS

This application claims the benefit of priority of U.S. Provisional Patent Application No. 63/081,815, filed Sep. 22, 2020, the entirety of which is incorporated herein by reference.

TECHNICAL FIELD

Various aspects of the disclosure relate generally to medical articulation systems, devices, and related methods. Examples of the disclosure relate to systems, devices, and related methods for articulating a medical tool relative to a subject, among other aspects.

BACKGROUND

Surgical procedures of the respiratory system may include, for example, removal of a mass or growth (e.g., pulmonary nodule) located within a lung, among others. These procedures may involve accessing a bronchus within the lung of a patient. Accessory devices for performing such procedures may include limited control or maneuverability, especially within small and tortuous bronchioles. Further, interfaces of such devices may provide limited articulating capabilities for maneuvering the device through the bronchiole, thereby requiring use of additional devices or multiple hands to manipulate said device.

SUMMARY

Aspects of the disclosure relate to, among other things, systems, devices, and methods for treating a target treatment site using an articulating device providing enhanced degree of maneuverability, among other aspects. Each of the aspects disclosed herein may include one or more of the features described in connection with any of the other disclosed aspects.

According to an example, a medical device includes a handle, an actuator movably coupled to the handle, a shaft extending distally from the handle, and a sheath including a distal end disposed within the shaft and a proximal end disposed within the handle. The sheath includes a plurality of branches secured to one another at the distal end and separated from one another at the proximal end. The actuator is coupled to each of the plurality of branches at the proximal end of the sheath, and the actuator is configured to move each of the plurality of branches relative to one another to articulate the shaft in a plurality of directions.

Any of the medical devices described herein may include any of the following features. The actuator includes a ball joint at least partially disposed within the handle. The plurality of branches are disposed about the ball joint in an annular array. The ball joint includes an opening that is configured to receive one or more devices. The plurality of branches form a closed lumen along the distal end of the sheath and an open lumen at the proximal end of the sheath. The closed lumen is completely surrounded along a first length of the sheath by the plurality of branches, and the open lumen is not completely surrounded along a second length of the sheath by the plurality of branches. The open lumen and the closed lumen are aligned with the opening in the ball joint, such that the sheath is configured to receive the one or more devices extending through the ball joint into the open and closed lumens. The plurality of branches are secured to an interior surface of the shaft at the distal end of the sheath. The plurality of branches are secured to a flexible tube disposed within the shaft along the distal end of the sheath. The plurality of branches are movable relative to one another at the proximal end of the sheath. The plurality of branches translate and rotate relative to the handle. The handle includes a first channel and a second channel that has a cross-sectional profile that is smaller than the first channel. The proximal end of the sheath and at least a portion of the actuator is received within the first channel. A proximal portion of each of the plurality of branches is disposed within and spaced apart from one another in the first channel. The proximal portion of each of the plurality of branches is configured to flex radially within the first channel in response to movement of the actuator relative to the first channel. A distal portion of each of the plurality of branches is received within the second channel. The distal portion of each of the plurality of branches is configured to translate within the second channel in response to movement of the actuator relative to the first channel. Further including a cutting tool positioned on a distal end of the shaft.

According to another example, a medical device includes a handle, an actuator rotatably coupled to the handle, a shaft extending distally from the handle, and a sheath including a plurality of branches. The plurality of branches are secured to the actuator at a proximal end and to the shaft at a distal end. The plurality of branches are movable relative to one another at the proximal end and immovable relative to one another at the distal end. The actuator is configured to articulate the shaft by rotating relative to the handle and translating at least one of the plurality of branches relative to the remaining plurality of branches.

Any of the medical devices described herein may include any of the following features. The actuator includes a ball joint at least partially disposed within the handle, and the plurality of branches are disposed about the ball joint in an annular array. The ball joint includes an opening that is configured to receive one or more devices. The plurality of branches form a closed lumen along the distal end of the sheath and an open lumen at the proximal end of the sheath. The closed lumen is completely surrounded along a first length of the sheath by the plurality of branches, and the open lumen is not completely surrounded along a second length of the sheath by the plurality of branches. The open lumen and the closed lumen are aligned with the opening in the ball joint, such that the sheath is configured to receive the one or more devices extending through the ball joint into the open and closed lumens. The handle includes a first channel and a second channel that has a smaller diameter than the first channel. A proximal portion of each of the plurality of branches is configured to flex radially within the first channel in response to movement of the actuator relative to the first channel. A distal portion of each of the plurality of branches is configured to translate within the second channel in response to movement of the actuator relative to the first channel.

According to a further example, a medical device includes a handle, a shaft extending distally from the handle, an end effector at a distal end of the shaft, and an actuator secured to the shaft. The actuator is configured to provide omnidirectional movement of the distal end of the shaft. The medical device includes a sheath disposed within the shaft and defining a lumen that receives the end effector. A proximal end of the sheath is attached to the actuator and a distal end of the sheath is attached to the shaft. The sheath is bifurcated into at least a first branch and a second branch, and the actuator is configured to move the first branch relative to the second branch at the proximal end of the sheath to articulate the distal end of the shaft and deflect the end effector.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Access to a bronchus (e.g., a bronchiole) within a patient to remove a target object has been proposed. In such procedures, the target object may be a mass or growth, such as a pulmonary nodule, located within a bronchus. The bronchus may include one or more bronchioles defining a passageway with a relatively small diameter. An ancillary device capable of removing the target object may be placed through the bronchiole via a medical instrument (e.g., a bronchoscope) capable of maneuvering through the bronchus to access the target treatment site. Ancillary devices, medical instruments, and systems suited for traversing the bronchus are limited, however.

Examples of the disclosure include systems, devices, and methods for manipulating materials and/or objects (e.g., pulmonary nodule) at a target treatment site within a subject (e.g., patient) with enhanced degree of maneuverability. In examples, accessing a patient's lung includes endoluminal placement of an end effector, e.g., a jaw assembly, needle assembly, cautery knife, or other like tool into the target treatment site. Placement of the end effector may be via a catheter, scope (endoscope, bronchoscope, colonoscope, etc.), tube, or sheath, inserted into an anatomical passageway via a natural orifice. The orifice can be, for example, the nose, mouth, or anus, and the placement can be in any portion of the respiratory tract, including the throat. Placement also can be in other organs or body lumens, including any portion of the gastrointestinal tract, urologic tract, etc. This disclosure is not limited to any particular medical procedure or treatment site within a body.

Reference will now be made in detail to aspects of the disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the subject. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal." As used herein, the terms "about," "substantially," and "approximately," indicate a range of values within +/−10% of a stated value.

Examples of the disclosure may relate to devices and methods for performing various medical procedures and/or treating portions of the respiratory tract, and/or any other suitable patient anatomy (collectively referred to herein as a "target treatment site"). As mentioned above, this disclosure is not limited to any specific medical device or method, and aspects of the disclosure may be used in connection with any suitable medical tool and/or medical method, at any suitable site within the body. Various examples described herein include single-use or disposable medical devices.

Figure 1:
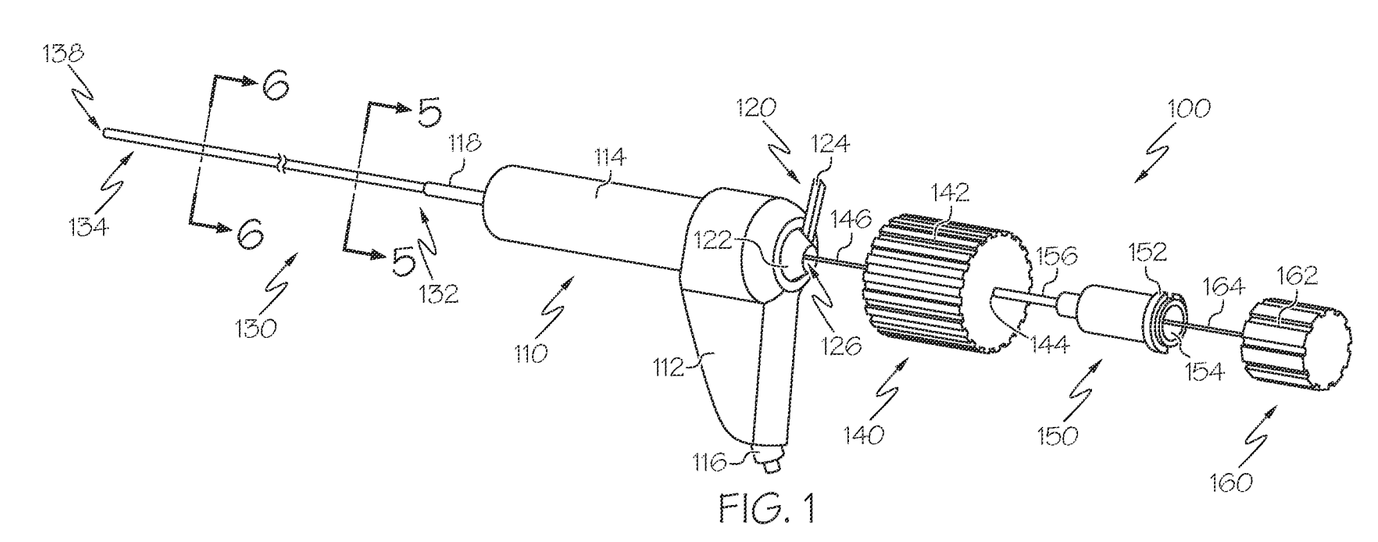
FIG. 1 is a perspective view of an exemplary medical device including a handle, a shaft, and an actuator, according to aspects of this disclosure.

FIG. 1 shows an exemplary medical device 100 in accordance with an example of this disclosure. Medical device 100 may include a handle 110, an actuator 120, and a shaft 130. Handle 110 may include a proximal body 112 and a distal body 114, with proximal body 112 defining an interface for manually grasping handle 110. In the example, handle 110 may further include a connection port 116 (e.g., an electrical connection) for coupling one or more devices to medical device 110. For example, a cable coupled to an ancillary device may be coupled to handle 110 at connection port 116. Distal body 114 may extend distally from proximal body 112, and shaft 130 may extend distally from distal body 114.

In the example, shaft 130 may be at least partially received in handle 110, such as within distal body 114. Handle 110 may include a distal end 118 extending distally from distal body 114, and including a strain relief configured to maintain shaft 130 outwardly from distal body 114 in a distal direction, and relieve strain at the interface of shaft 130 and distal body 114. Shaft 130 may include a proximal shaft segment 132 and a distal articulation joint 134 that extends distally from proximal shaft segment 132. In the example, proximal shaft segment 132 may form a unitary component with distal articulation joint 134. In other examples, distal articulation joint 134 may be attached to a distal end of proximal shaft segment 132. Shaft 130 may further include an opening 138 at a distal end of distal articulation joint 134. As described in further detail herein, one or more devices received through a lumen of shaft 130 may be extended distally from distal articulation joint 134 via opening 138.

Still referring to FIG. 1, actuator 120 may be movably coupled to handle 110. In the example, actuator 120 may be positioned along proximal body 112. Actuator 120 may include a ball joint 122 and a knob 124 extending laterally outward from ball joint 122. Ball joint 122 may be at least partially received within an opening along a proximal face of proximal body 112. In some examples, ball joint 122 may have a shape (e.g., spherical) that corresponds with a shape of the opening on proximal body 112. Actuator 120 may further include an opening 126 disposed through ball joint 122, and configured to receive one or more devices therethrough. It should be appreciated that opening 126 may facilitate access to one or more lumens and/or cavities disposed within handle 110. As described further herein, actuator 120 may be configured to articulate distal articulation joint 134 in response to moving relative to handle 110.

In some embodiments, medical device 100 may further include a guidewire assembly 140, a port assembly 150, and a tool assembly 160. Guidewire assembly 140 may include a proximal knob 142 and a distal shaft 146 extending distally from proximal knob 142. Proximal knob 142 may define a grasping feature that facilitates manual manipulation of guidewire assembly 140 by a user of medical device 100. For example, rotation and/or translation of proximal knob 142 may provide simultaneous rotation and/or translation of distal shaft 146, such as, for example, relative to handle 110 and/or shaft 130. Guidewire assembly 140 may be sized and/or shaped to extend into handle 110 via opening 126, and through a lumen of shaft 130.

Proximal knob 142 and distal shaft 146 may include a lumen 148 (see FIGS. 5-6) extending between a proximal end of proximal knob 142 and a distal end of distal shaft 146, with proximal knob 142 including an opening 144 that facilitates access to lumen 148. Guidewire assembly 140 may be configured to receive one or more devices through opening 144, such as, for example, port assembly 150, tool assembly 160, and more. As described in detail herein, guidewire assembly 140 may facilitate positioning the one or more devices through handle 110 and outwardly from shaft 130 via opening 138. Distal shaft 146, which may be made of Nitinol or other suitable materials, may transmit torque from the proximal end of medical device 100 to the distal end of medical device 100. In other embodiments, guidewire assembly 140 may be omitted entirely from medical device 100.

Still referring to FIG. 1, port assembly 150 may include a proximal knob 152 and a distal shaft 156. Proximal knob 152 may define a grasping feature that facilitates manual manipulation of port assembly 150 by a user of medical device 100. Proximal knob 152 may include an attachment mechanism, such as one or more threads (e.g., a luer connector), configured to facilitate connection of port assembly 150 to one or more ancillary devices (e.g., a fluid source, a pressure medium source, etc.). Port assembly 150 may include an opening 154 at proximal knob 152 that is configured to receive one or more devices or fluids therein. Distal shaft 156 may extend distally from proximal knob 152, and may be sized and shaped to be received within opening 126 and/or opening 144. With distal shaft 156 received within one of opening 126 and/or opening 144, port assembly 150 may be effectively coupled to shaft 130 via one or more of handle 110 and/or guidewire assembly 140.

In some embodiments, port assembly 150 may be fixed to guidewire assembly 140. For example, distal shaft 156 may be received through opening 144 and crimped to proximal knob 142 to securely fix port assembly 150 to guidewire assembly 140. In other embodiments, port assembly 150 may be removably coupled to guidewire assembly 140. Distal shaft 156 may terminate within proximal knob 142, and be in fluid communication with a lumen of shaft 130 via guidewire assembly 140.

In some embodiments, port assembly 150 may be configured to deliver a material (e.g., a therapeutic drug, a contrast medium, a fluid, etc.) to shaft 130 from a device coupled to proximal knob 152. In other embodiments, port assembly 150 may be configured to extract a material (e.g., a tissue sample, a fluid, etc.) through shaft 130 for receipt at the device coupled to proximal knob 152 (e.g., a syringe or other device that provides suction). In further embodiments, port assembly 150 may be omitted entirely from medical device 100.

Tool assembly 160 may include a proximal knob 162 and a distal shaft 164. Proximal knob 162 may define a grasping feature that facilitates manual manipulation of tool assembly 160 by a user of medical device 100. Distal shaft 164 may extend distally from proximal knob 162, and may be sized and shaped to be received within opening 126, opening 144, and/or opening 154. Tool assembly 160 may further include an end effector 165 at a distal end of distal shaft 164 (see FIGS. 7-8).

Figure 2:
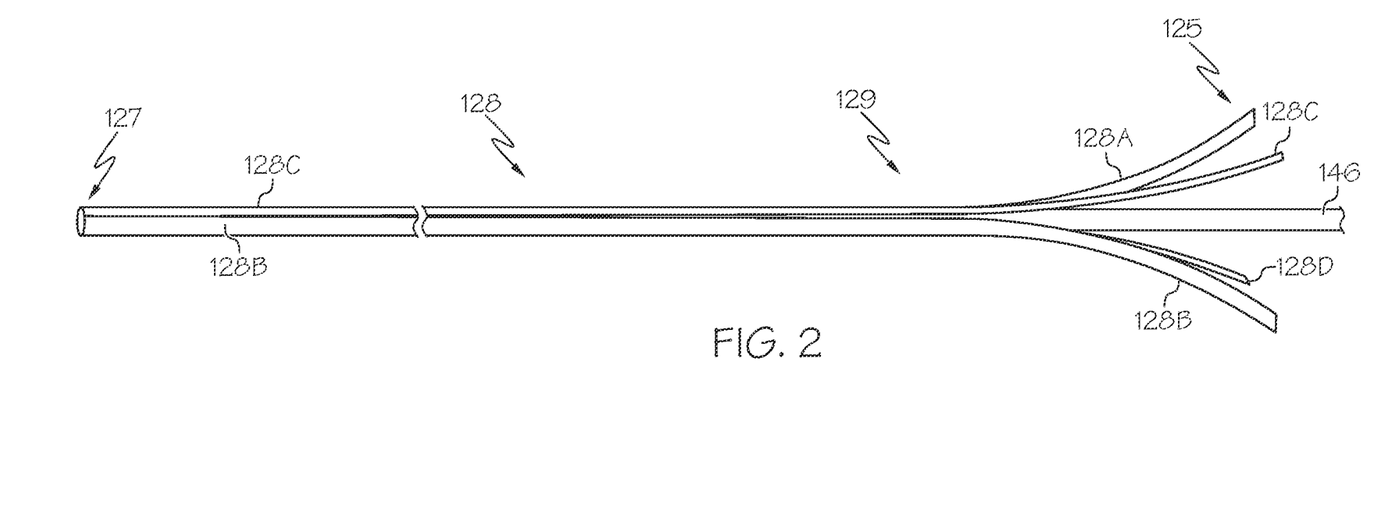
FIG. 2 is a side elevational view of a sheath of the medical device of FIG. 1, the sheath including a plurality of branches, according to aspects of this disclosure.

Referring now to FIG. 2, medical device 100 may include a sheath 128 having a longitudinal length defined between a proximal end 125 and a distal end 127. Sheath 128 may include one or more (e.g., a plurality) branches, such as, for example, a first branch 128A, a second branch 128B, a third branch 128C, and a fourth branch 128D. Each of the plurality of branches 128A-128D may extend between proximal end 125 and distal end 127, and may collectively define a lumen for receiving one or more devices through sheath 128, such as distal shaft 146. In the example, the plurality of branches 128A-128D may define a closed lumen along a distal portion of sheath 128 adjacent to distal end 127, and an open lumen along a proximal portion of sheath 128 adjacent to proximal end 125. Stated differently, a lumen of sheath 128 may be enclosed within a confined space by the plurality of branches 128A-128D at distal end 127, and not enclosed within a confined space at proximal end 125 where space exists between adjacent branches 128A-128D.

The plurality of branches 128A-128D may be separated from one another at proximal end 125, and secured to one another at distal end 127. For example, branches 128A-128D may be secured to one another along a distal portion of sheath 128 proximal to distal end 127 and distal to proximal end 125. In other examples, branches 128A-128D may be secured to one another at distal end 127. As described further herein, proximal ends 125 of each of the plurality of branches 128A-128D may move (e.g., flex, translate, etc.) relative to one another, while distal ends 127 of each of the plurality of branches 128A-128D may be fixed relative to one another. Branches 128A-128D may be formed of various suitable materials having at least a minimum rigidity and flexibility, including, for example, a plastic (e.g., high-density polyethylene (HDPE). It should be appreciated that medical device 100 may omit the need for, and use of, one or more actuation wires with the use of sheath 128. Accordingly, a diameter of shaft 130 may be relatively minimal as shaft 130 includes a single lumen in lieu of multiple lumens for receiving each of the one or more actuation wires, as in conventional shafts.

Figure 3:
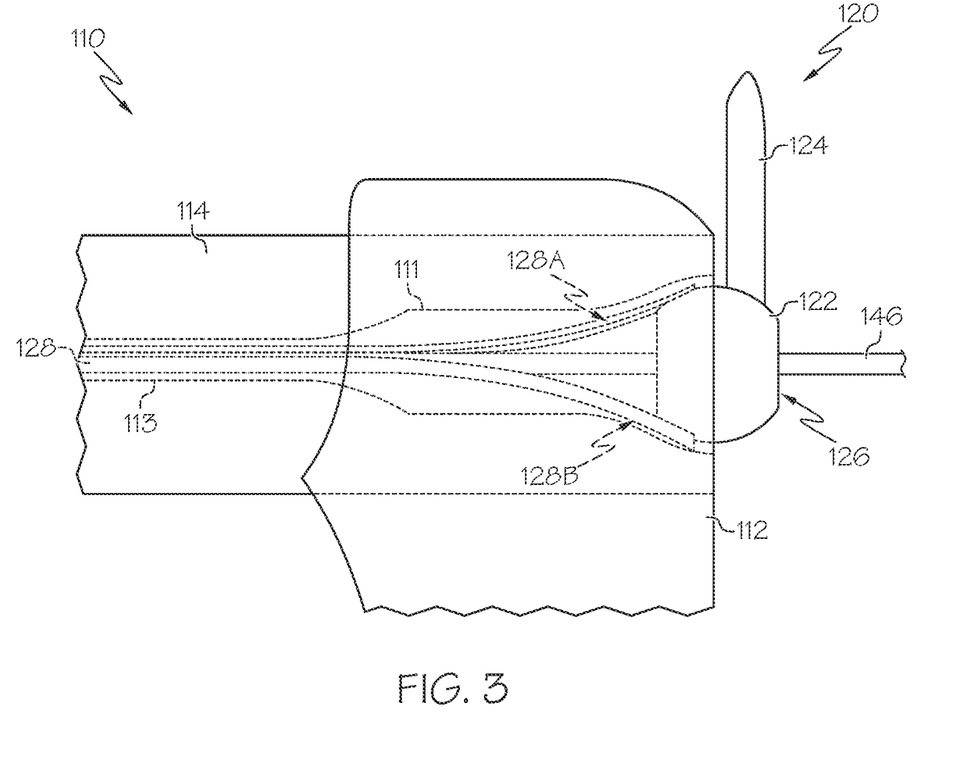
FIG. 3 is a partial side view of the handle of the medical device of FIG. 1 with the actuator and sheath disposed therein, according to aspects of this disclosure.

As seen in FIG. 3, the plurality of branches 128A-128D may be disposed within handle 110 and coupled to actuator 120. In the example, proximal ends 125 of the plurality of branches 128A-128D may be coupled to ball joint 122 at a plurality of locations, by any suitable method of adhesion (e.g., gluing, welding, etc.). Stated differently, each of the plurality of branches 128A-128D may be secured about a circumference of ball joint 122 at different locations. For example, proximal ends 125 of the plurality of branches 128A-128D may be disposed in an annular array about ball joint 122. In the example, the plurality of branches 128A-128D may be equally spaced about a circumference of ball joint 122 and separated from one another at substantially equidistant angles, e.g., 90 degree intervals, from one another. Further, each of the plurality of branches 128A-128D may be equally sized relative to one another (e.g., each branch 128A-128D includes a 90 degree segment of a tube, such as sheath 128). In other examples, branches 128A-128D may have varying sizes relative to one another.

Proximal body 112 may include a first channel 111 and distal body 113 may include a second channel 113 for receiving portions of the plurality of branches 128A-128D. For example, first channel 111 may be sized and shaped to receive proximal ends 125 of the plurality of branches 128A-128D, and second channel 113 may be sized and shaped to receive at least an intermediate portion of the plurality of branches 128A-128D. Second channel 113 may extend through distal body 114 and toward distal end 118, such that second channel 113 may align with a lumen of shaft 130. In other embodiments, second channel 113 may receive at least a portion of shaft 130 therein, and particularly proximal shaft 132.

First channel 111 may include a relatively greater cross-sectional profile relative to second channel 113 to facilitate movement of the plurality of branches 128A-128D within handle 110. First channel 111 may be configured to at least partially receive actuator 120 therein, and particularly at least a portion of ball joint 122. Ball joint 122 may be configured to move (e.g., rotate, pivot, etc.) within first channel 111 to cause movement of the plurality of branches 128A-128D within first channel 111 and second channel 113.

For example, actuator 120 may be configured to move the plurality of branches 128A-128D radially relative to a longitudinal axis of sheath 128, and within one or more of channels 111, 113. Actuator 120 may be further configured to translate the plurality of branches 128A-128D longitudinally (e.g., in a proximal and distal direction) within channels 111, 113. Further, actuator 120 may be configured to rotate the plurality of branches 128A-128D about the longitudinal axis of sheath 128, and relative to channels 111, 113. It should be understood that actuator 120 may be configured to move (e.g., translate, rotate, pivot, etc.) the plurality of branches 128A-128D in response to moving knob 124 relative to proximal body 112 to cause movement of ball joint 122 within first channel 111. It should further be understood that moving proximal ends 125 may cause a corresponding movement of distal ends 127 within shaft 130. As described in detail herein, distal ends 127 may be received within, and secured to, distal articulation joint 134.

Figure 4:
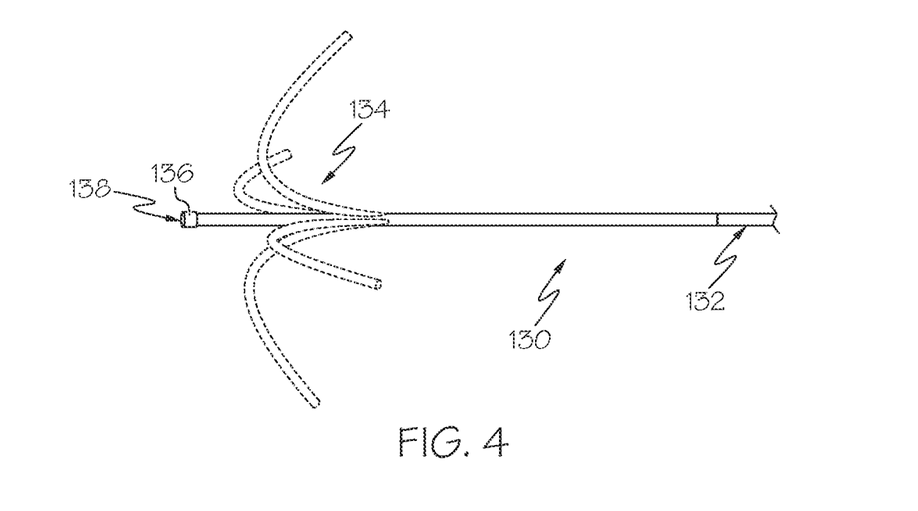
FIG. 4 is a partial perspective view of the shaft of the medical device of FIG. 1, with the shaft articulated to a plurality of positions, according to aspects of this disclosure.

Referring now to FIG. 4, shaft 130 is schematically depicted with distal articulation joint 134 actuated to a plurality of different positions. With distal ends 127 disposed within distal articulation joint 134, the plurality of branches 128A-128D may be configured to move (e.g., deflect) distal articulation joint 134 to the plurality of positions in response to branches 128A-128D moving within channels 111, 113 and shaft 130. With branches 128A-128D secured to ball joint 122, and ball joint 122 rotatably coupled to handle 110 with a 360 degree range of motion, actuator 120 may be configured to move distal articulation joint 134 to a plurality of positions corresponding to a movement of ball joint 122 relative to a longitudinal axis of shaft 130. Stated differently, a direction of bend of distal articulation joint 134 (relative to the longitudinal axis of shaft 130) may correspond to a direction of movement of ball joint 122 relative to said axis (which is the same axis as the longitudinal axis of sheath 128). It should be appreciated that each distal end 127 may be secured to distal articulation joint 134 such that the plurality of branches 128A-128D may include a fixed position relative to shaft 130.

Accordingly, distal articulation joint 134 may be caused to articulate in a direction of one of the plurality of branches 128A-128D that is translated proximally when actuator 120 is actuated. That is, at least one of the plurality of branches 128A-128D may apply a proximal (e.g., pulling) force onto distal articulation joint 134 when the at least one branch 128A-128D is translated proximally relative to shaft 130 and channels 111, 113, thereby causing distal articulation joint 134 to bend in a direction of the at least one branch 128A-128D. It should be appreciated that the plurality of branches 128A-128D may be further configured to rotate distal articulation joint 134 in various direction (e.g., clockwise, counter clockwise, etc.).

Still referring to FIG. 4, shaft 130 may include a cutting tool 136 disposed at a distal end of distal articulation joint 134. Cutting tool 136 may be configured to cut one or more objects positioned adjacent to the distal end of distal articulation joint 134, such as, for example, tissue. Cutting tool 136 may include various suitable devices, including, for example, a knife, a blade, a sharp edge, a cautery device, and more. In the example, cutting tool 136 may include a cautery device having a cylindrical body disposed about a circumference of distal articulation joint 134, and specifically about a distal end of distal articulation joint 134. As described in further detail herein, the cautery device may be configured to receive electrical energy and/or current from a power source (e.g., coupled to handle 110 via connection port 116) to cauterize tissue surrounding the cautery device.

Figure 5:
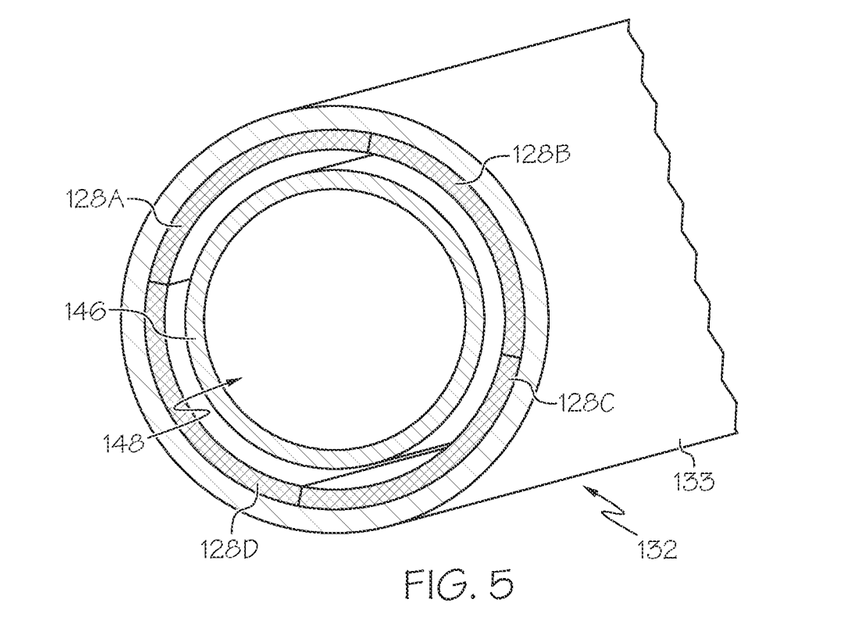
FIG. 5 is a cross-sectional perspective view of a proximal portion of the shaft of the medical device of FIG. 1, according to aspects of this disclosure.

Referring now to FIG. 5, proximal shaft 132 is depicted including an outer layer 133 defining a lumen for receiving one or more devices therethrough, such as sheath 128, distal shaft 146, and more. Outer layer 133 may be formed of various suitable materials, including, for example, plastic. Outer layer 133 may be further formed of a material having a predefined hardness ranging from about 60 D (durometer) to about 90 D, and particularly 72 D to 80 D. Sheath 128 may be formed of a material (e.g., plastic) having a relatively similar predefined hardness as outer layer 133.

Sheath 128 may include four branches 128A-128D that each has substantially equal cross-sectional profiles relative to one another. In other embodiments, the plurality of branches 128A-128D may have varying cross-sectional profiles. Sheath 128 may include additional and/or fewer branches than those shown and described herein without departing from a scope of this disclosure. Each of the plurality of branches 128A-128D may be secured to one another (e.g., along corresponding edges that interface with one another) at an intermediate and/or distal portion of sheath 128, such as adjacent to distal ends 127. In other embodiments, as described further herein, the plurality of branches 128A-128D may be secured to one or more other components of medical device 100 (e.g., distal articulation shaft 134, distal shaft 146, etc.).

Distal shaft 146 may be formed of various suitable materials, including, for example, Nitinol wire. In some embodiments, distal shaft 146 may be configured to increase a rigidity of medical device 100 along proximal shaft 132 when disposed within a lumen of shaft 130. In further embodiments, distal shaft 146 may be configured to transmit a torque from proximal ends 125 of the plurality of branches 128A-128D to distal ends 127 when distal shaft 146 is disposed within sheath 128. Distal shaft 146 defines lumen 148, which may be sized and shaped to receive one or more devices, such as, for example, distal shaft 164.

Figure 6:
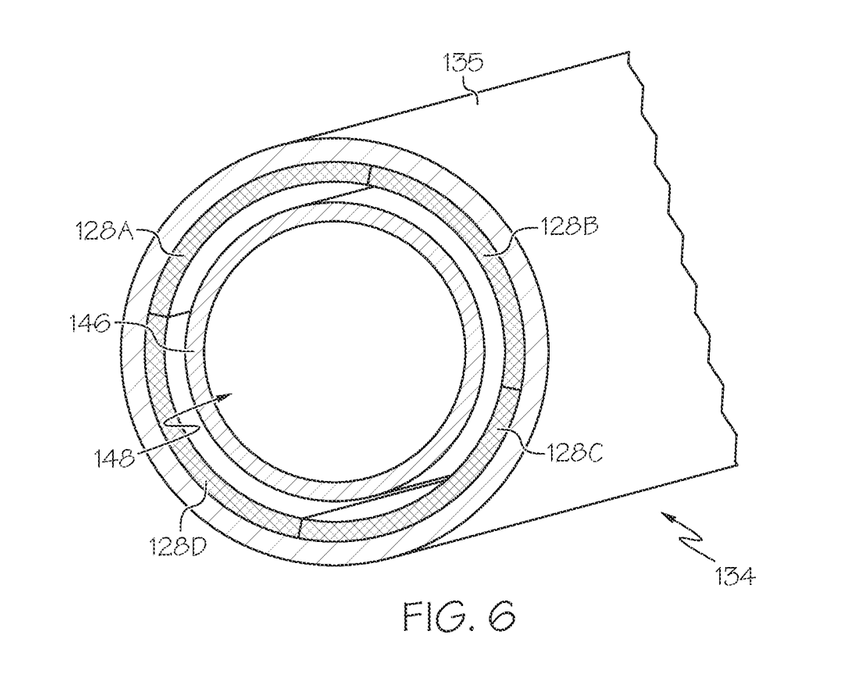
FIG. 6 is a cross-sectional perspective view of a distal portion of the shaft of the medical device of FIG. 1, according to aspects of this disclosure.

Referring now to FIG. 6, distal articulation joint 134 is depicted including an outer layer 135 defining a lumen for receiving one or more devices therethrough, such as sheath 128, distal shaft 146, and more. Outer layer 135 may be formed of various suitable materials, including, for example, plastic. Outer layer 135 may be further formed of a material having a predefined hardness that is relatively less than outer layer 133 of proximal shaft 132. For example, outer layer 135 may have a predefined hardness ranging from about 1 D to about 50 D, and particularly 3 D to 40 D.

In one embodiment, the plurality of branches 128A-128D may be secured to an interior surface of outer layer 135, such as along an intermediate and/or distal portion of sheath 128 (e.g., adjacent to distal ends 127). Branches 128A-128D may be secured to outer layer 135 in various suitable manners, including, for example, by an adhesive. In this instance, sheath 128 may be configured to bend outer layer 135 in response to the one or more branches 128A-128D translating relative to shaft 130, when actuator 120 is moved proximally and/or distally. Sheath 128 may be further configured to rotate shaft 130 relative to handle 110 in response to the one or more branches 128A-128D rotating relative to shaft 130, when actuator 120 is rotated relative to handle 110. Alternatively, shaft 130 may be fixed relative to handle 110 such that sheath 128 may be inhibited from rotating relative to shaft 130 when branches 128A-128D are secured to outer layer 135. Further, distal shaft 146 may be moved (e.g., translated) relative to sheath 128 and shaft 130, and guidewire assembly 140 may be removed (e.g., disengaged) from handle 110 and shaft 130.

In another embodiment, the plurality of branches 128A-128D may be secured to an exterior surface of distal shaft 146 (e.g., along a distal portion) in lieu of, or in addition to, the interior surface of outer layer 135. Branches 128A-128D may be secured to distal shaft 146 in various suitable manners, including, for example, by an adhesive. In this instance, sheath 128 may be configured to bend the distal shaft 146 in response to the one or more branches 128A-128D translating relative to shaft 130. Distal shaft 146 may be fixed relative to sheath 128 and/or shaft 130, such that guidewire assembly 140 may be irremovable from handle 110 and shaft 130.

In some embodiments, distal shaft 146 may include a distal portion that is flexible, such as relative to a proximal portion of distal shaft 146. For example, a distal portion of distal shaft 146 may be formed of various elastic materials, including but not limited to, rubber, plastic elastomers, and the like. In other embodiments, a flexible tube may be coupled (e.g., by an adhesive, ultraviolet curing, etc.) to distal shaft 146, such that the flexible tube may define a distal portion of distal shaft 146. The flexible tube may be formed of a flexible material relative to distal shaft 146, such that the flexible tube may provide a flexibility along the distal portion of distal shaft 146. In this instance, branches 128A-128D may be secured to an exterior surface of the flexible tube, and sheath 128 may be configured to bend the flexible tube when the one or more branches 128A-128D translate relative to shaft 130. The distal portion of distal shaft 146 may include a marker (e.g., echogenic) configured to facilitate visualization of distal shaft 146 with one or more imaging devices (e.g., ultrasound system).

With cutting tool 136 including a cautery device, medical device 100 may further have a wire extending through the lumen of shaft 130. The wire may be disposed between various layers of proximal shaft 132 and distal articulation joint 134, such as, for example, between sheath 128 and outer layers 133, 135. The wire may extend through handle 110 and be coupled to a power source via connection port 116 (see FIG. 1).

Figure 7:
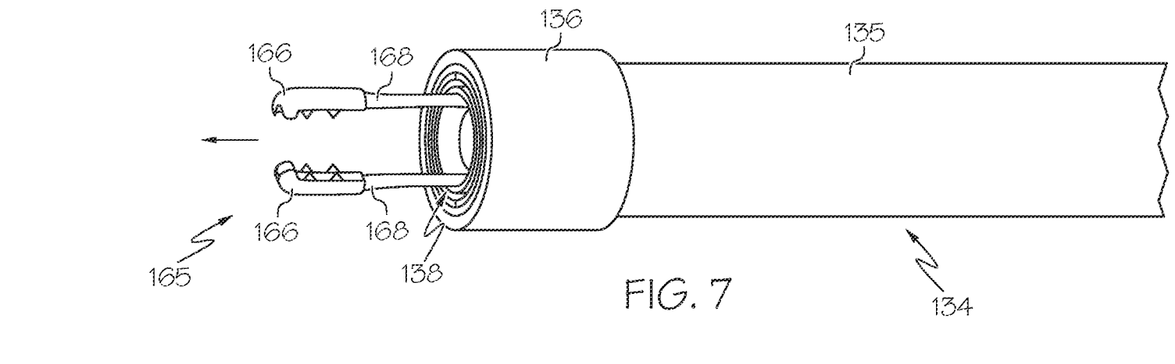
FIG. 7 is a perspective view of the shaft of the medical device of FIG. 1 with an end effector partially deployed, according to aspects of this disclosure.
Figure 8:
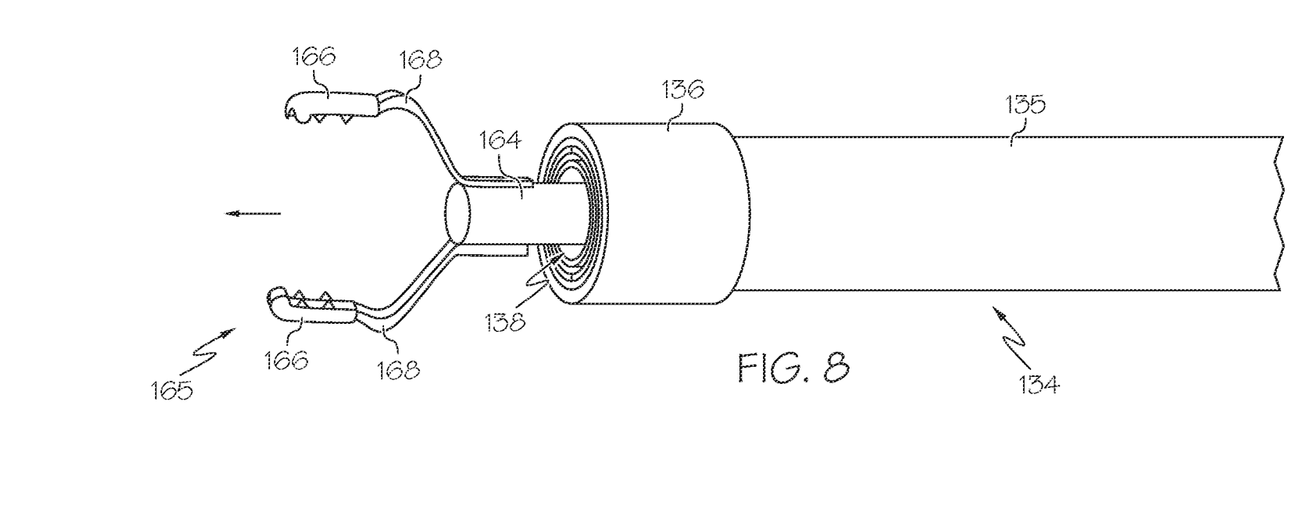
FIG. 8 is a perspective view of the shaft of the medical device of FIG. 1 with the end effector fully deployed, according to aspects of this disclosure.

Referring to FIGS. 7-8, a distal end of distal articulation joint 134 is depicted with end effector 165 extending outward from the lumen of shaft 130 through opening 138. In the example, end effector 165 may include a pair of jaws 166 and a pair of arms 168. A proximal end of the pair of arms 168 may be secured to a distal end of distal shaft 164, such as by welding, crimping, an adhesive, etc. A distal end of the pair of arms 168 may include the pair of jaws 166, with the pair of arms 168 having a predefined curve between the proximal and distal ends. The pair of arms 168 may be formed of a deformable material such that arms 168 may be configured to deform in response to an application of force thereto, such as, for example, by shaft 130. Suitable materials include Nitinol or other metal alloys.

As seen in FIG. 7, the pair of arms 168 may be deformed to a linear, compact configuration (e.g., parallel to a longitudinal axis of shaft 130) when a distal end of distal shaft 164 is disposed within the lumen of distal articulation joint 134. In this instance, distal articulation joint 134 and/or distal shaft 146 may apply a radially inward force onto the pair of arms 168 while end effector 165 is substantially disposed within distal articulation joint 134. As seen in FIG. 8, the pair of arms 168 may be deformed to an expanded configuration (e.g., transverse to a longitudinal axis of shaft 130) when the distal end of distal shaft 164 is extended distally from the lumen of distal articulation joint 134 via opening 138. It should be appreciated that end effector 165 may move (e.g., translate, rotate, etc.) relative to shaft 130 in response to movement of proximal knob 162.

Each of the pair of jaws 166 may include a plurality of teeth positioned along an interior surface of jaws 166. It should be understood that end effector 165 may include various suitable configurations, including, but not limited to, one or more clamps, shears, forceps, scissors, suturing devices, lighting devices, imaging systems, grasper assemblies, and various other suitable tools and/or devices. Accordingly, end effector 165 shown and described herein is merely exemplary such that medical device 100 may include various other end effectors without departing from a scope of this disclosure.

According to an exemplary method of using medical device 100, a medical instrument (e.g., a bronchoscope, an endoscope, etc.) may be initially navigated through the body of a subject to position a distal end of the medical instrument at a treatment site (e.g., a bronchi). Medical device 100 may be received within the medical instrument, and shaft 130 may extend outwardly from the distal end of the medical instrument. In this instance, distal articulation joint 134 may be positioned within the subject and at the treatment site while handle 110 is positioned external from the subject at a proximal end of the medical instrument. It should be appreciated that end effector 165 may be maintained within shaft 130 during delivery of medical device 100 through the medical instrument. Further, cutting tool 136 may be used to facilitate access of distal articulation joint 134 to the treatment site.

Referring to FIG. 1, actuator 120 may be actuated (e.g., rotated, pivoted, etc.) to articulate distal articulation joint 134 to at least one of a plurality of positions, to direct medical device 100 from the treatment site (e.g., the bronchi) to a target area within the treatment site (e.g., a bronchiole branch). By way of illustrative example, knob 124 may be pulled proximally to move ball joint 122 in a proximal direction, thereby pulling at least first branch 128A proximally and pushing second branch 128B distally (see FIG. 3).

Referring to FIG. 3, first branch 128A may flex radially within handle 110, such as toward a top interior surface of first channel 111, and second branch 128B may flex radially within first channel 111 in a similar direction as first branch 128A. Further, first branch 128A may translate proximally within second channel 113, and second branch 128B may translate distally within second channel 113. In this instance, distal articulation joint 134 may bend in a direction that corresponds to (e.g., is the same as) a relative position of first branch 128A relative to the remaining branches 128B-128D. Stated differently, distal articulation joint 134 may bend in a direction that is opposite of a relative position of second branch 128B relative to the remaining branches 128A-128D.

It should be appreciated that the target area may define a bodily space within the subject that includes a size, shape, and/or configuration that the medical instrument is incapable of accessing. Upon positioning the distal end of distal articulation joint 134 toward the target area, cutting tool 136 may be actuated to sever an object targeted for removal (e.g., a cancerous mass) from the surrounding target area. For example, cutting tool 136 may be actuated to cauterize tissue adjacent to the cancerous mass to separate the mass from the subject's body. Further, guidewire assembly 140 may be received through handle 110 via opening 126. In embodiments where distal shaft 146 is not fixed to sheath 128, it should be appreciated that movement of proximal knob 142 (e.g., translation, rotation, etc.) proximal to handle 110 may provide simultaneous movement of distal shaft 146 relative to distal articulation joint 134. Distal shaft 146 may be extended distally from shaft 130 at opening 138 and positioned adjacent to the target object.

Still referring to FIG. 1, port assembly 150 may be coupled to guidewire assembly 140 via opening 144 to perform one or more functions, including delivery of a substance to the target area or aspiration of the target area. Further, tool assembly 160 may be coupled to port assembly 150 to move distal shaft 164 through handle 110 and shaft 130. In other examples, port assembly 150 may be decoupled from guidewire assembly 140 such that tool assembly 160 may be directly coupled to guidewire assembly 140. It should be appreciated that movement of proximal knob 162 (e.g., translation, rotation, etc.) proximal to handle 110 may provide simultaneous movement of distal shaft 164 relative to distal articulation joint 134.

In some embodiments, a secondary guidewire may be received within opening 144 and extended through shaft 130. A distal portion of the secondary guidewire may be extended distally from distal shaft 146, such that the secondary guidewire is positioned adjacent to the target object. A proximal portion of the secondary guidewire may be secured to the medical instrument, thereby fixing a position of the secondary guidewire relative to handle 110 and shaft 130. In this instance, proximal knob 142 may be translated proximally, thereby retracting distal shaft 146 from the target area and out of medical device 100. Tool assembly 160 may be coupled directly to the secondary guidewire with distal shaft 164 received within a lumen of the secondary guidewire or riding (e.g., translating) over the secondary guidewire.

Referring to FIG. 7, proximal knob 162 may be translated distally toward handle 110 to extend end effector 165 distally from distal articulation joint 134. End effector 165 may be maintained in a closed configuration as the pair of arms 168 are positioned substantially within a lumen of distal articulation joint 134. Further translation of proximal knob 162 toward handle 110 may provide distal extension of end effector 165 from opening 138. As seen in FIG. 8, the pair of arms 168 may bow radially outwardly when arms 168 are positioned substantially external from distal articulation joint 134. It should be appreciated that the pair of arms 168 are biased to a predefined shape where arms 168 are positioned away from one another. Accordingly, end effector 165 may be configured to automatically transition to an open configuration (FIG. 8) when a radial force applied against arms 168 (e.g., from an interior surface of distal articulation joint 134) is removed.

Referring to FIG. 8, the pair of jaws 166 may move radially outward relative to one another in response to a distal translation of distal shaft 164 from opening 138. With end effector 165 in the open configuration, the pair of jaws 166 may be positioned adjacent to the target object and returned to the closed configuration to grasp the target object. In some embodiments, end effector 165 may be transitioned to the closed configuration in response to moving distal articulation joint 134 distally relative to distal shaft 164, thereby abutting a distal end of distal articulation joint 134 against arms 168. As the pair of arms 168 are received with distal articulation joint 134, end effector 165 is transitioned to the closed configuration (FIG. 7) such that the pair of jaws 166 move toward one another and grasp the target object positioned therebetween.

In other embodiments, end effector 165 may be transitioned to the closed configuration in response to moving proximal knob 162 proximally relative to distal articulation joint 134, thereby abutting arms 168 against a distal end of distal articulation joint 134. The pair of jaws 166 may be retracted into a lumen of distal articulation joint 134, thereby extracting the target object from the target area and into medical device 100. It should be appreciated that retracting end effector 165 into shaft 130 may further detach the target object from the target area. For example, cutting tool 136 may include a blade positioned about opening 138 and along a distal edge of distal articulation joint 134. In this instance, medical device 100 may be configured to cut the mass from the surrounding tissue in response to the pair of jaws 166 pulling the mass through distal articulation joint 134 and cutting tool 136 abutting against the mass.

In an embodiment, shaft 130 may be retracted proximally relative to the subject and the medical instrument, to remove the target object from the subject's body. In another embodiment, proximal knob 162 may be translated proximally relative to handle 110 to retract distal shaft 164 from shaft 130. In this instance, the target object is removed from the subject and distal articulation joint 134 is maintained at the target area. Upon removal of tool assembly 160 from handle 110, port assembly 150 may be recoupled to perform one or more functions, including delivery of a substance to the target area or aspiration of the target area.

Each of the aforementioned systems, devices, assemblies, and methods may be used to access and/or manipulate target tissue with enhanced degree of maneuverability. By providing a medical device with an intuitive handle interface capable of controlling an actuation and articulation of an end effector with a single hand, a user may utilize another hand to control other devices and/or tools during a procedure for treating the target site. In this instance, a user may reduce overall procedure time, increase efficiency of procedures, and/or avoid unnecessary harm to a subject's body caused by limited control of the other tools/devices.

It will be apparent to those skilled in the art that various modifications and variations may be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

We claim:

1. A medical device, comprising:
   a handle;
   an actuator movably coupled to the handle;
   a shaft extending distally from the handle; and
   a sheath including a distal end disposed within the shaft and a proximal end disposed within the handle, wherein the sheath includes a plurality of branches each secured directly to at least two adjacent branches of the plurality of branches at the distal end and separated from one another at the proximal end;
   wherein the actuator is coupled to each of the plurality of branches at the proximal end of the sheath, and the actuator is configured to move each of the plurality of branches relative to one another to articulate the shaft in a plurality of directions.

2. The medical device of claim 1, wherein the actuator includes a ball joint at least partially disposed within the handle; and
   wherein the plurality of branches are disposed about the ball joint in an annular array.

3. The medical device of claim 2, wherein the ball joint includes an opening that is configured to receive one or more devices.

4. The medical device of claim 3, wherein the plurality of branches form a closed lumen along the distal end of the sheath and an open lumen at the proximal end of the sheath.

5. The medical device of claim 4, wherein the closed lumen is completely surrounded along a first length of the sheath by the plurality of branches, and the open lumen is not completely surrounded along a second length of the sheath by the plurality of branches.

6. The medical device of claim 4, wherein the open lumen and the closed lumen are aligned with the opening in the ball joint, such that the sheath is configured to receive the one or more devices extending through the ball joint into the open and closed lumens.

7. The medical device of claim 1, wherein the plurality of branches are secured to an interior surface of the shaft at the distal end of the sheath.

8. The medical device of claim 1, wherein the plurality of branches are secured to a flexible tube disposed within the shaft along the distal end of the sheath.

9. The medical device of claim 1, wherein the plurality of branches are movable relative to one another at the proximal end of the sheath.

10. The medical device of claim 9, wherein the plurality of branches translate and rotate relative to the handle.

11. The medical device of claim 9, wherein the handle includes a first channel and a second channel that has a cross-sectional profile that is smaller than the first channel.

12. The medical device of claim 11, wherein the proximal end of the sheath and at least a portion of the actuator is received within the first channel.

13. The medical device of claim 12, wherein a proximal portion of each of the plurality of branches is disposed within and spaced apart from one another in the first channel; and
    wherein the proximal portion of each of the plurality of branches is configured to flex radially within the first channel in response to movement of the actuator relative to the first channel.

14. The medical device of claim 11, wherein a distal portion of each of the plurality of branches is received within the second channel; and
    wherein the distal portion of each of the plurality of branches is configured to translate within the second channel in response to movement of the actuator relative to the first channel.

15. The medical device of claim 1, further including a cutting tool positioned on a distal end of the shaft.

16. A medical device, comprising:
    a handle;
    an actuator movably coupled to the handle;
    a shaft extending distally from the handle; and
    a sheath including a distal end disposed within the shaft and a proximal end disposed within the handle, wherein the sheath includes a plurality of branches secured to one another at the distal end and separated from one another at the proximal end, and wherein the plurality of branches alone form a closed lumen along the distal end;
    wherein the actuator is coupled to each of the plurality of branches at the proximal end of the sheath, and the actuator is configured to move each of the plurality of branches relative to one another to articulate the shaft in a plurality of directions.

17. The medical device of claim 16, wherein the plurality of branches form an open lumen at the proximal end of the sheath,
    wherein the actuator includes a ball joint at least partially disposed within the handle, and the plurality of branches are disposed about the ball joint in an annular array; and
    wherein the ball joint includes an opening that is configured to receive one or more devices.

18. The medical device of claim 17, wherein the open lumen and the closed lumen are aligned with the opening in the ball joint, such that the sheath is configured to receive the one or more devices extending through the ball joint into the open lumen and the closed lumen.

19. The medical device of claim 16, wherein the handle includes a first channel and a second channel that has a smaller diameter than a diameter of the first channel;
    wherein a proximal portion of each of the plurality of branches is configured to flex radially within the first channel in response to movement of the actuator relative to the first channel; and
    wherein a distal portion of each of the plurality of branches is configured to translate within the second channel in response to movement of the actuator relative to the first channel.

* * * * *